United States Patent [19]
Friedman

[11] 3,800,872
[45] Apr. 2, 1974

[54] METHODS AND COMPOSITIONS FOR RECOVERY OF OIL

[75] Inventor: Robrt H. Friedman, Houston, Tex.

[73] Assignee: Getty Oil Company, Los Angeles, Calif.

[22] Filed: Oct. 10, 1972

[21] Appl. No.: 296,019

Related U.S. Application Data

[63] Continuation-in-part of Ser. No. 152.411, June 11, 1971, abandoned, which is a continuation-in-part of Ser. No. 42,328, June 1, 1970, abandoned.

[52] U.S. Cl............. 166/270, 166/275, 252/8.55 D
[51] Int. Cl........................................... E21b 43/22
[58] Field of Search............ 166/294, 270, 273–275, 166/300; 252/8.55 D, 8.55 R

[56] References Cited
UNITED STATES PATENTS

| | | | |
|---|---|---|---|
| 3,227,212 | 1/1966 | Black et al. | 166/294 |
| 3,460,623 | 8/1969 | Leach | 166/275 X |
| 3,297,084 | 1/1967 | Gogarty et al. | 166/273 |
| 3,378,070 | 4/1968 | Wessler et al. | 166/294 X |
| 3,611,733 | 10/1971 | Eilers et al. | 166/294 X |
| 2,882,227 | 4/1959 | Lindberg | 252/8.55 E |
| 3,372,749 | 3/1968 | Williams | 166/275 X |
| 3,146,200 | 8/1964 | Goldstein et al. | 252/8.55 R X |
| 3,084,122 | 4/1963 | Cypert et al. | 252/8.55 D |
| 3,053,765 | 9/1962 | Sparks | 166/274 |
| 3,530,938 | 9/1970 | Cooper | 166/273 |

*Primary Examiner*—Stephen J. Novosad
*Attorney, Agent, or Firm*—Arnold, White & Durkee

[57] ABSTRACT

Methods are provided for recovery of petroleum oil from a subterranean formation which include injecting into the formation an aqueous flooding medium which assumes a viscosity in oil-rich portions of the formation that is significantly less than the viscosity assumed in the portions low in oil content, the flooding medium thereby preferentially driving the oil, as opposed to water, from the formation. In one embodiment, the flooding medium comprises a pH control agent having a partition coefficient in favor of oil, change in pH occuring when the flooding medium meets oil, the pH change resulting in marked change in viscosity of the flooding medium. In one particular embodiment, the flooding medium includes guar gum and borate ion, which will complex upon the pH change. In another embodiment, the flooding medium includes a material such as guar which imparts a high viscosity but is subject to rapid degradation by the bacteria in the formation, and a poisoning agent for the bacteria, such as ortho-cresol, which is preferentially soluble in oil.

In yet another embodiment the flooding medium comprises an aqueous solution of sodium carboxymethylcellulose in combination with other agents which include, in specific preferred embodiments, chromium potassium sulfate and ortho-cresol.

Methods of post primary recovery are provided which include injection of a flooding medium of this type into an injection well, whereupon the flooding medium enters oil-rich and water-rich portions of the formation but assumes a viscosity in the water-rich portions which is much greater than that in the oil-rich portions, inhibiting fluid flow through the water-rich portions. Well fluids are then produced from a producing well at favorable oil-to-water production ratios.

40 Claims, 2 Drawing Figures

Robert H. Friedman
INVENTOR

METHODS AND COMPOSITIONS FOR RECOVERY OF OIL

CROSS-REFERENCE TO RELATED APPLICATIONS

This application is a continuation-in-part of application Ser. No. 152,411, filed June 11, 1971, now abandoned which is a continuation-in-part of application Ser. No. 42,328, filed June 1, 1970, also now abandoned.

BACKGROUND OF THE INVENTION

This invention relates to the recovery of petroleum oil from subterranean formations, and more particularly relates to methods and compositions useful for post-primary recovery of oil.

When a well is first drilled and production is commenced, recovery of oil from the well is termed primary recovery. Because of such factors as low pressure differentials or low permeabilities or porosities, it usually develops that a "post-primary" recovery process will be undertaken. These processes are in common use today, and include secondary recovery processes, tertiary recovery processes, etc., and are sometimes referred to in the art merely as "secondary" processes. As much or more oil is often recovered by theses processes as is recovered during primary recovery.

Post-primary recovery processes take various forms, but the form with which this invention is most closely concerned is the water-flooding type process. In this type process, it is customary to drill an injection well at some point distant from the producing well. Water (or other aqueous medium) is injected into the injection well and this water will theoretically "flood" or drive the oil in the formation toward the producing well, from which it may be produced.

Oil-bearing formations cannot be considered as having a homogenous nature. It is well known that the permeability profiles of pay sands show irregularities both horizontally and vertically. Oil-bearing strata may be separated by shale streaks which prevent vertical migration between them and provide independent paths between an injection well and producing wells. These independent paths will often have differing effective permeabilities. These and other factors result in the watering out of certain portions of an oil-bearing formation prior to the watering out of other portions during water flooding. When this occurs, water passing through a watered-out stratum results in oil production at increasingly unfavorable water-to-oil ratios. This water by-passing often becomes a controlling factor in determining the final recovery which may be obtained economically by water flooding operations. This is particularly true when the oil sand is highly heterogeneous.

The shape of a reservoir which is swept by an advancing front of injected water may be such that large quantities of theoretically recoverable oil will not be affected by the water flood. In such a case, the flooding medium is said to have poor conformance or areal sweep efficiency.

Three characteristics are desirable for a displacing fluid. These are miscibility with oil, viscosity greater than oil, and conformance to the shape and nature of the reservoir. A displacing fluid which has two or three of these characteristics will recover more oil than two or three fluids which have only one.

Because of the enormous economic significance of processes of this nature, a very large amount of time and energy have been devoted to this problem by the art and most especially by the oil industry. Various proposals have been made to remedy the present problems, which are many, and some of these proposals have found practicality in certain situations. But as yet no generally satisfactory solutions have been forthcoming.

One reason for the lack of commercial success of prior art methods is a matter of simple economics. If oil is to be replaced in a reservoir, the replacing fluid must necessarily be less valuable than oil. No crude oil, except for a few Pennsylvania crudes, sells for more than a few cents per gallon, and only a few fluids, other than water, cost less. Further, any chemical added to the water must either be very inexpensive or be used in very small concentration.

Studies of reservoirs after water flooding have indicated that two-thirds of the residual oil is frequently located in portions of the reservoir which water flooding has not touched. While in the water-swept portions, oil content is probably near the irreducible minimum, oil content in the unswept portions may be near the original value.

Past efforts at post-primary recovery have been directed toward more efficient recovery of the oil, but inherent in these methods is the fact that they rely on more efficient recovery in those areas where the flooding medium has already been depleting the oil.

The present invention, on the other hand, is directed toward reducing the ability of the flooding medium to flow through portions of the formation which are low in oil content, thereby forcing the flooding medium to flow instead through oil-rich portions of the reservoir (portions which are often otherwise by-passed by a flooding medium), and thereby increasing the production from the oil-rich portions of the formation. Consequently the oil-to-water ratio is significantly improved; the economic benefits are substantial and, in fact, in many cases may mean the difference between practical and impractical processes.

Hopefully, the displacement accomplished according to the methods of this invention will be efficient. Even if it should be inefficient, though, the result will usually be much greater recovery of oil that is realized with the prior art methods mentioned above.

SUMMARY OF THE INVENTION

The invention relates to post-primary processes for the production of petroleum oil, and includes in the method embodiments the provision of a flooding medium, injection of the flooding medium into an injection well, and producing well fluids from a producing well after the flooding medium has increased in viscosity in the water-rich portions of the formation to inhibit further flow of flooding medium through those portions of the formation.

The methods and compositions of the invention are particularly useful in these instances when an oil reservoir has previously been subjected to a water flood, although they may be used in other recovery techniques. Since the methods of the invention will normally be employed after an initial period of "primary" recovery from the well, the terms "post-primary" or "secondary" recovery may be appended to these processes. It will be understood, however, that the methods of the invention may be useful during the primary recovery process or at any stage thereafter, as may be desired, depending upon the circumstances prevailing on a particular well. In post-primary recovery processes, one or more injection wells and one or more producing wells may be drilled into the subterranean reservoir, and a flooding medium—generally an aqueous fluid—is injected through the injection wells to drive the oil (with the flooding medium) to the producing wells.

In its broadest aspects, the invention relates to an oil recovery process which includes the injection into the reservoir of an aqueous liquid which preferentially seeks the oil bearing portions of the region, substantially by-passing the water-diluted portions, thereby selectively pushing the oil to a suitable recovery area.

More specifically, the present invention relates to such processes wherein this is accomplished by providing an aqueous injection fluid which is significantly more viscous in water than in oil whereby the fluid upon injection conforms to the oil-rich regions of the reservoir. When the reservoir is one which has previously been water-flooded, the injection fluid will conform to the regions of the reservoir which have not been previously produced. Such flooding medium is thus particularly effective when the reservoir has been previously water-flooded, and paths or fingers have developed between injection wells and producing wells such that additional water or other flooding medium injected follows these paths rather than conforming to the reservoir.

In one embodiment of the invention, an aqueous flooding medium is provided which includes guar gum and borate ion with a pH control agent having a high oil-water partition coefficient. The guar gum and borate ion in the aqueous medium complex at a changed pH to reduce the viscosity of the medium. The change in pH occurs as a result of the transfer of the pH control agent to oil because of the control agent's high oil/water partition coefficient.

In another embodiment, an aqueous flooding medium is provided which includes a material (for example a heavy gum such as guar) which imparts a high viscosity to the flooding medium, but which is highly susceptible to bacterial degradation by the bacteria present in a subterranean reservoir. The injection fluid also carries with it a bactericide (or "poisoning agent") effective against such bacteria, which poisoning agent is preferentially soluble in oil. Desirably, the poisong agent is almost entirely soluble in oil and insoluble or just barely soluble in water. Thus, when the flooding medium of this embodiment encounters oil-rich regions, the poisoning agent goes into solution in the oil, leaving the heavy gum unprotected. The bacteria then devour the heavy gum almost immediately, greatly dropping the viscosity of the flooding medium. On the other hand, when the flooding medium encounters an area low in oil content, the poisoning agent is not dissolved, thus protecting the heavy gum so that the high viscosity of the flooding medium is retained.

In yet another embodiment, the flooding medium provided includes a viscosity building agent, a reactive agent for reacting with the viscosity-building agent to increase the viscosity thereof, and a delayed reaction catalyst which promotes the reaction of the reactive agent with the viscosity building agent, but only after a significant period of time so that the flooding medium may escape the region of the injection borehole before significant viscosity buildup.

In any case, the flooding medium becomes significantly less viscous in oil regions and tends to conform to oil-rich portions of the reservoir to selectively drive the well fluids from those portions of the reservoir.

The viscosity of the flooding medium can also be changed in the reservoir by other techniques described hereinafter.

DETAILED DESCRIPTION OF PREFERRED EMBODIMENTS

Figure 1:
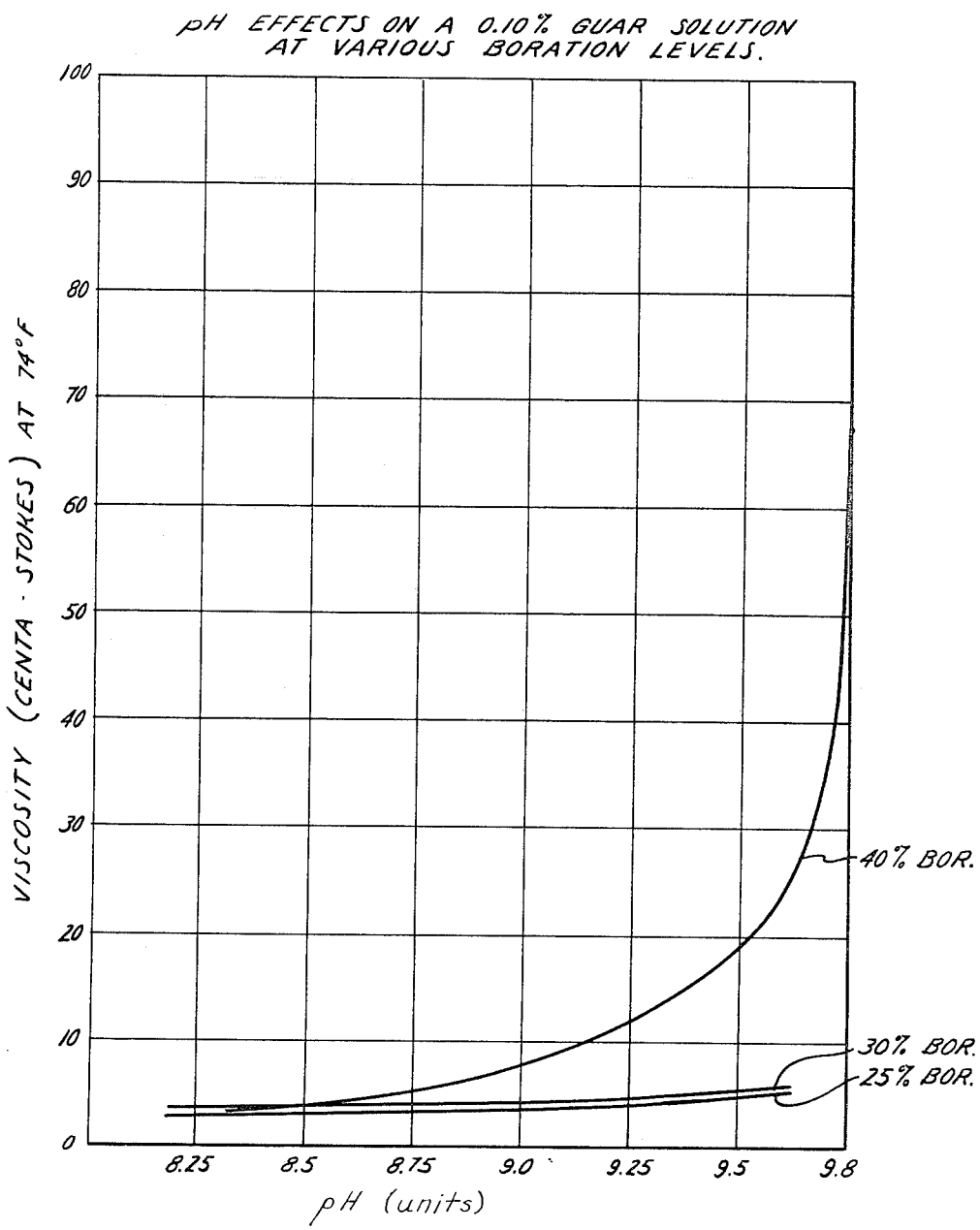
FIG. 1 is a graph of the viscosity of an aqueous solution containing, based on the weight of water, 0.10 weight percent guar gum which has been borated to the levels indicated, against the pH of the solution using sodium hydroxide as the pH control agent.
Figure 2:
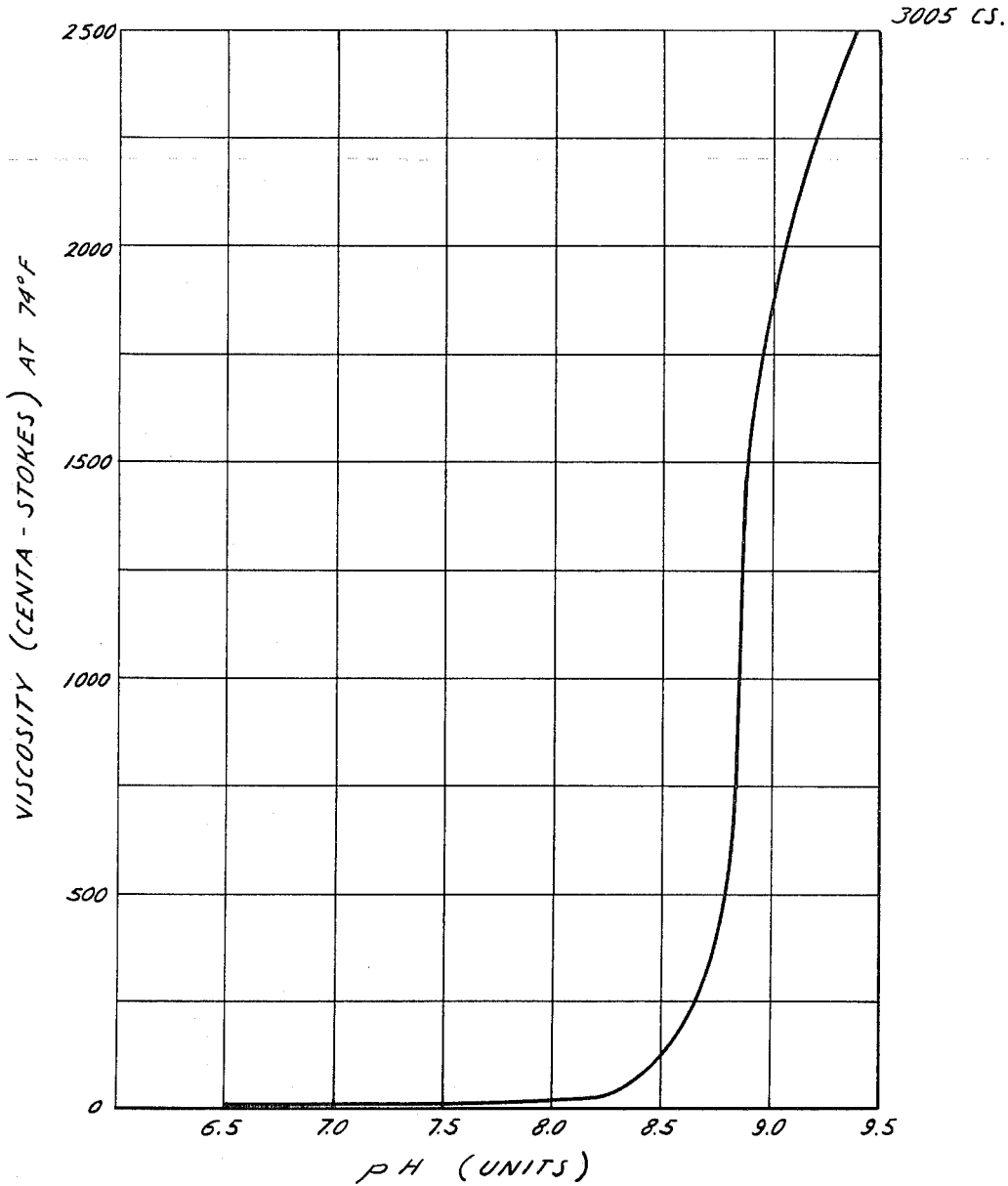
FIG. 2 is a graph of the viscosity of an aqueous solution containing 0.18 weight percent guar which has been borated to 25 percent based on weight, against the pH of the solution using sodium hydroxide as the pH control agent.

The following detailed description of embodiments which applicant presently considers preferred, and which at the time of this application appear to applicant to represent the best modes of his invention, will be in terms of post-primary recovery processes, even though it is recognized that in certain circumstances it may be that such processes might be used for primary recovery.

As mentioned above, it is customary in connection with waterflood type post-primary recovery processes to drill one or more injection wells and to introduce the aqueous flooding medium into the injection wells to force oil toward the producing well or wells, thereafter producing oil from the producing wells. For convenience of expression, the discussion will be in terms of a single producing well and a single injection well.

The exact injection-production pattern of wells employed will, of course, depend on the nature of the reservoir under consideration. Any suitable pattern or other flooding procedure may be employed in accordance with the methods and materials described herein.

In accordance with this invention, the aqueous flooding medium is one which assumes in water-rich portions of the formation a viscosity which is much greater than that which it assumes in oil-rich portions of the formation. By oil-rich portions of the formation or reservoir are meant, for purposes of this description, those portions or strata of the formation wherein the oil content is greater than about 45 percent. By water-rich portions of the formation are meant those wherein the oil content is less than about 30 percent. Those portions of the formation wherein the oil content is between about 30 and about 45 percent may be considered mixed strata or mixed portions and will for purposes of this invention not be of primary interest.

Upon assuming great viscosities in the water-rich portions of the formation, flow through these portions is reduced so that channeling or by-passing of the flooding medium therethrough, which has been a persistent problem with the prior recovery processes, is prevented. The flooding medium must then preferentially push through the oil-rich portions of the formation in order to reach the producing wells, and in the process will carry the recoverable oil along to be produced.

In accordance with one embodiment of the invention, a flooding medium is provided which includes guar gum, borate ion, and a base. Guar gum, a nonionic, neutral polysaccharide derived from the seed of the guar tree, is a galactomannan. The nature of the material is explained by A. M. Goldstein and E. N. Alter in "Industrial Gums," *Academic Press*, New York, 1959, Chapter 14, p. 325. When a guar moleclue is fully hydrated, it carries with it a large quantity of water, which makes it a large, colloidal-size molecule.

The large colloid molecules interfere with other similar molecules and, thus, resist shear. Viscosity increases almost exponentially with concentration so that while a 0.1 percent by weight solution may have a viscosity less than 2 centipoises, a fully hydrated 1.0 percent solution will have a viscosity of about 2800 centipoises.

The large guar molecules can be caused to link up with each other and form a meshed structure or gel. Guar gels can be made which are rigid solids.

The large size of the guar molecule is not without its disadvantages. Fully hydrated guar particles, while smaller than one micron each, cannot be forced through a tight core if the guar is in high concentration. When the molecules are close together they interfere with each other and the "tangling" of the molecules produces a system which acts like one with much larger particles. Gelling the guar results in even larger effective molecular sizes.

If a linking agent, such as boric acid or borax, the sodium salt of boric acid, is added to a 1 percent fully hydrated guar solution, the solution will gel. If, however, the procedure is reversed and one attempts to dissolve guar in a solution containing borax, hydration will not occur. The guar then appears to be water insoluble and no viscosity increase will be measured. The reason for this is that if the borate ion finds two or more guar molecules close together, there is a fair probability that it will link them together.

If, on the other hand, the borate gets to the slowly hydrating molecule before the guar molecules get close together to link, the intermolecular distances are too large to be spanned by the small borate ion. This causes the borate to use all its functional points to hook to one guar molecule, shielding it from hydration. If a very dilute guar solution is allowed to fully hydrate and is subsequently borated, the solution loses viscosity.

Boric acid, $H_3BO_3$, is a very weak inorganic acid, the first ionization constant being $5.8 \times 10^{-10}$. The borate ion does not exist as such until the pH is sufficiently high to react with the more firmly bound second and third hydrogens. The borate ion complexes with many compounds, for example, certain polysaccharides like guar and locust beam gum, as well as polyvinyl alcohol. At high pH, above about 8.0, the borate ion exists and is available to cross-link and cause gelling. At lower pH, the borate is tied up by hydrogen and is not available for cross-linking. Thus, gellation caused by borate ion is reversible.

Another way in which borate ion forms a complex is with a cis diol, a diol where two alcohol groups are on adjacent carbon atoms. If boric acid is added to a cis diol like glycerol, the resulting chelate holds the borate ion so tightly that the hydrogens become relatively labile. This makes a strong acid of boric acid. If a cis diol is added to a borate gelled guar, the gel disappears because the diol attracts the borate more strongly than does the guar.

The term "partition coefficient" as used herein is explained by the following example. If a compound is partially soluble in each of two immiscible solvents and a solution of the compound in one of the solvents is agitated with the other solvent, the compound will distribute between the two in such a way that the ratio of the concentrations will be a constant. Thus, if the concentration in the first solvent is C and the two solvents are intimately mixed and allowed to separate, the final concentration in the first solvent, $C_1$, and the final concentration in the second, $C_2$, will bear the ratio $C_1/C_2=K$ which is essentially independent of the original value, C. The constant K is called the partition coefficient.

Specifically, one preferred aqueous flooding medium in accordance with the invention comprises water, borate ion, guar gum in a concentration based on the weight of water between about 0.1 and about 0.2 percent, and a base such as sodium hydroxide or an organic amine. The preferred form of this base is one which has strong basic activity, is sufficiently soluble in water to render the pH equal to 8, has a partition coefficient at least near 100 favoring oil, and is capable of rapid diffusion through oil and water. Preferred materials include the organic amines, such as Ethomeen C/15, an ethyoxylated cocoa amine produced by Armour Co.

The amine should be selected on the basis that it has an ionization constant larger than $10^{-5}$, that it have a solubility in water of $10^{-2}$ molar, and that it has a much larger solubility in oil. Sufficient amine is used to make the pH of the mixture about 8.

Borax and/or boric acid in a concentration of about 15 to about 40 percent by weight of the guar gum is present in the solution in order that the borate ion can complex with the guar gum to yield the proper viscosity. Borax and boric acid may be mixed in order to achieve a controllable pH in the flooding medium. Borax by itself ordinarily renders the pH of the flooding medium too high.

A preservative, such as formaldehyde, phenol, chlorophenol, or a phenol derivative, may be employed to minimize degradation of the guar gum, and a reducing agent, such as ethylene, to prevent oxidation of the guar, may be added as desired, depending of course on local reservoir conditions. A surfactant may also be included in the solution if desired to improve interfacial tension with the oil and improve the efficiency of the flood.

The solution can be made up, for example, at a viscosity of about 30 centipoises. It is then injected into the reservoir at high rate to take advantage of the thixotropic nature of the guar solution, thus reducing necessary pump pressure. Opposite water in the reservoir, the fluid will maintain the original viscosity. Opposite oil, the preferentially oil-soluble base will pass into the oil. This transfer of base lowers the pH of the flooding solution, causing the borate ion to become unavailable for cross-linking, and decreases the viscosity of the flooding solution to about 6 centipoises, for example, the exact viscosity depending on the resultant pH of the solution. The flooding solution will still be sufficiently viscous, however, to displace oil efficiently. Thus, an oil-seeking fluid is provided, and markedly increased conformance to the reservoir is achieved.

One potential limiting parameter in the technique is the diffusion rate of the base. When the flooding medium contacts oil, it is desirable that the base leave the water and enter the oil rapidly. It is also desirable that the base diffuse through the oil rapidly so that the concentration in the oil at the interface is maintained relatively low.

It is believed that one way to increase the effective rate of transfer of the base to the oil from the water is to choose a base which has a solubility in water several times as much as is necessary in order to make pH of 8. A flooding medium with this base at a viscosity of 30 centipoises, for example, is then injected into the formation as a slug, for example, 10,000 barrels. This injection is followed by a larger injection, such as 90,000 barrels, of flooding medium which is low in content of the base and as a result has a low viscosity, such as about 6 centipoises. Several desirable results follow from this slug treatment.

The thin second fluid will tend to cut through the thick fluid initially injected. This will occur mainly in the high permeability zones normally still wet from water flooding. When the thin fluid contacts base, it will thicken, thus slowing down movement in the wet zones. Because of the high base concentration in the slug, the rate of base diffusion into the thin second fluid will be rapid.

Where the slug contacts oil, diffusion of base into the oil will be rapid because of the high concentration gradient. Pumping problems are reduced since only ten percent of the fluid, the slug, has high initial viscosity, and the degree to which adsorption of base on rock may interfere with the process is diminished by the excess base. When such interference in a particular reservoir is established, compensation can be made of course by making the slug larger or by adjusting the concentration of the base.

After the initial treatment with the two fluids is made, the treatment may be continued in cycles as injection proceeds.

It is desired for purposes of the techniques described herein to have the extraction from flooding medium to oil create the greatest possible pH change in the flooding medium within a particular range of pH. Ideally, of course, one would wish that the change would be from about pH 10 to about pH 7. For practical purposes, however, it is better to change, for example, 0.8 units from about 9.3 to 8.5 than 1.2 units from 8.2 to 7.0, because a larger viscosity change is observed in the borated guar in the former case. To achieve the maximum change, two factors are of importance. The first of these is the partition coefficient. The higher this value is, the more base is extracted. The second consideration is that of base strength. If the base is very strong, as strong as sodium hydroxide for example, then only a small amount of base will effect wide changes in pH.

Guar solutions should be filtered prior to injection in order to clean the solution and remove any cellulosic material which might tend to plug pores in the formation. Further, flooding solutions containing 0.1 percent or more guar gum should be used in relatively permeable strata, such as those usually associated with heavy oils, rather than low permeability strata, such as those usually associated with light oils. The 0.1 percent and higher guar solutions tend to plug strata of low permeability apparently as a result of guar molecules becoming tangled and acting as larger molecules.

In oil formations of low permeability, another technique is preferably employed. Experiments made with very dilute guar solutions showed that very dilute solutions of guar gum lose viscosity when treated with high pH borate. The borate ion self-links guar molecules and reduces their volume and contribution to viscosity.

In this technique, a very dilute guar solution is made, below about 0.05 percent guar gum, and preferably below 0.03 percent. An organic acid, such as nitrophenol, is added to the solution along with sodium hydroxide in amounts sufficient to keep the initial pH below about 8.0. Boric acid, a weak organic acid with a high oil/water partition coefficient, is added to the solution in an amount sufficient to borate between one and twenty percent of the guar. The ionization constant for the organic acid which allowed for maximum pH change proved to be between about $10^{-8}$ and about $10^{-9}$. Nitrophenol and chlorophenol are preferred acids for this purpose, and also act as preservatives for the guar.

The system operates just as did the system originally described except that viscosity is lost by boration at high pH after organic acid transfer to oil so that contact with oil must raise the pH rather than lower it.

It was also found that the effective viscosity of these dilute guar solutions in oil-producing formation was sufficient to maintain a desirable mobility ratio with respect to oil, even though the viscosity measured in a capillary viscometer appeared too small to be of advantage.

Another technique for reducing the viscosity of a solution of guar gum and borate ion is based on the fact that silica surfaces, whether sand or clay, have a negative charge. Negatively charged surfaces are electron donors, and are, in the Lewis sense, bases. Low molecular weight polyols in the flooding medium complex with borate ion to make it unavailable to the guar. The resultant complex is a strong acid which compounds the effect. Thus, a small amount of glycerol will destroy the linked structure created by borate and guar.

A region which has been water-flooded is less reducing than a region not already contacted by water. This is because the negative charges on the silica surfaces have to some extent been satisfied by oxygen in the water, as well as by other ions. When one of the ingredients of the flooding medium is glyceraldehyde, the oxidized form of glycerol, more reduction to glycerol will take place in the oil-rich parts of the reservoir than in the water-flooded portions. The resultant effect is a thinning of the fluid in the regions not previously contacted, while the higher viscosity is retained in the previously contacted sections.

Several cis diols useful in this technique, such as sorbitan monosterate, which are partially hydrolyzed fats, are commercially available and inexpensive. Oxidation by standard techniques will provide the oxidized form for use as an initial ingredient in the flood.

Another technique which may be employed involves preflushing the reservoir to place a desired material in the permeable paths or fingers of the oil formation, and then following the preflush with a second material which will thicken on contact with the first material. For example, preflushing with an aqueous solution containing borax or boric acid near a maximum concentration will locate the solution primarily in the permeable paths or fingers in the formation. A flooding solution of underborated guar, having a low viscosity, is then injected. In the oil regions, viscosity of the flooding solution will not change, but in the wet regions containing the borate ion, the flooding solution will thicken and increase the resistance to flow in the wet regions.

Polyvalent cations from the Group II and III elements of the periodic table may be employed in place of the borate ion, although borate ion is preferred. Acids involving these cations or the salts thereof may be used in making the solutions. Polyvinyl alcohol and polysaccharides, such as locust bean gum, may be used in place of the guar gum, although guar gum is definitely preferred.

One feature of this embodiment of the invention is that the materials employed are such that an increase or reduction in viscosity is reversible by adjusting the pH. Consequently, unwanted plugging of a formation, if it should occur, can be corrected by injecting a flushing solution which adjusts the pH of the material causing the unwanted plugging.

In accordance with another preferred embodiment of the invention, a flooding medium is provided which comprises (1) a material which imparts a high viscosity to the flooding medium, but which is highly susceptible to bacterial degradation by the bacteria located in the subterranean reservoir wherein the oil recovery processes occur, and (2) bactericide or poisoning agent which is preferentially soluble in oil, and which acts to poison the bacteria in the formation which the flooding medium traverses.

Suitable high viscosity material susceptible to bacterial degradation includes heavy natural gums such as guar. As explained above in connection with another embodiment of the invention, the viscosity of an aqueous solution of guar increases almost exponentially with increasing concentration of guar.

Subterranean reservoirs in which it is desired to increase oil recovery by the utilization of the present invention, contain large numbers of microscopic bacteria which will quickly degrade guar and other substances of this nature. Degradation of the guar will thus rapidly decrease the viscosity of the guar-containing solution.

It is desirable that the bactericide or poisoning agent employed in the contexts of use of this embodiment of the invention be one which is effective against the bacteria of the formation and which is almost entirely soluble in oil and which is insoluble or just barely soluble in water. One example of such a poisoning agent is ortho-cresol.

Ortho-cresol, $CH_3C_6H_4OH$, is soluble in oil but only slightly soluble in water. It has a specific gravity of 1.05, a melting point of 30.4°C., and a boiling point of 191°C. It is effective against the bacteria in a subterranean reservoir to destroy such bacteria.

The following tables illustrate the reduction in viscosity with time which occurs when ortho-cresol in differing concentrations is present in an aqueous solution of about 0.16 weight percent guar, the solution having an initial natural pH of about 7.8.

TABLE I

Solution containing 0.2% ortho-cresol

| Time | Viscosity in centipoises |
|---|---|
| initially | 7.2 |
| 24 hours | 6.6 |
| 48 hours | 6.3 |
| 96 hours | 5.7 |
| 168 hours | 5.3 |

TABLE II

Solution containing 0.1 % ortho-cresol

| Time | Viscosity in centipoises |
|---|---|
| initially | 7.2 |
| 24 hours | 6.6 |
| 48 hours | 5.5 |
| 96 hours | 4.2 |
| 168 hours | 2.7 |

TABLE III

Solution containing 0.01% ortho-cresol

| Time | Viscosity in centipoises |
|---|---|
| initially | 7.2 |
| 24 hours | 4.2 |
| 48 hours | 3.8 |
| 96 hours | 3.0 |
| 168 hours | 1.4 |

The measurements in the foregoing tables were made with an aqueous solution of guar in the concentration indicated, the guar comprising the only active ingredient in the solution. Other constituents of the solution will desirably include a preservative, to minimize degradation of the guar gum as long as the protective bactericide is present, a surfactant to carry the poisoning agent, and a base to adjust the pH to the desired level. In this connection, the following table indicates that strongly basic solutions are necessary to prevent bacterial degradation of an ortho-cresol containing aqueous solution of about 0.16 percent guar unless the ortho-cresol concentration is at least about 0.1 percent or greater. The pH of the system should thus be only slightly basic so that when the ortho-cresol is depleted in an oil-rich formation, rapid degradation of the aqueous guar solution may take place. Specifically, an initial pH of between about 7.5 and 8.0 has been found most satisfactory. The date in the table below is valid for a period of about 12 days.

TABLE IV pH needed to prevent bacterial degradation of an aqueous solution of about 0.16 percent guar, containing various concentrations of ortho-cresol

| % ortho-cresol | effective pH necessary |
|---|---|
| 0.20 | 7.8 |
| 0.15 | 8.1 |
| 0.10 | 8.6 |
| 0.07 | 8.75 |
| 0.05 | 8.8 |
| 0.03 | 8.97 |
| 0.01 | 9.03 |
| 0.005 | 9.05 |
| 0.001 | 9.2 |

As an example of the operation of this embodiment of the invention, an aqueous solution of from about 0.13 to about 0.20 percent guar is prepared as the flooding medium for use in a subterranean oil-containing reservoir from which it is desired to obtain recovery of oil. Ortho-cresol is added to the solution until the concentration of ortho-cresol is about 0.07–0.2 percent; a suitable surfactant such as Tergitol TMM, an ethoxylated nonylalcohol of Union Carbide, is added to carry the ortho-cresol, and a sufficient amount of suitable base such as sodium hydroxide is added to adjust the pH of the solution to approximately 7.8. A suitable preservative may be added if necessary, but in the example given ortho-cresol serves as preservative and no additional preservative is added.

The aqueous cresol-containing guar solution is then pumped down an injection well into the subterranean reservoir. When the solution comes into contact with an oil-rich portion of the reservoir, the ortho-cresol will be dissolved by the oil, thus greatly reducing the concentration of ortho-cresol in the solution. Without the ortho-cresol bactericide to protect the guar from the bacteria present in the underground formation, the guar will be rapidly degraded by the bacteria. As a result of such bacterial degradation, the viscosity of the solution will rapidly decrease. As seen from Table III above, a guar solution having only 0.01 percent ortho-cresol will show a decrease in viscosity from 7.2 to 4.2 centipoises in just 24 hours. Greater decreases in viscosity will be shown by solutions containing smaller amounts of the poisoning agent.

On the other hand, when the injection fluid comes into contact with fluid which is low in oil content, the ortho-cresol will not be dissolved and will remain in the solution to destroy the bacteria, thus protecting the highly viscous guar. From Table I, it is seen that the decrease in viscosity of a solution containing 0.2 percent ortho-cresol is from 7.2 to only 6.6 at the end of a 24-hour period.

In accordance with yet another embodiment of this invention, the flooding medium is one which includes a viscosity-building ingredient, a reactive agent which reacts with the viscosity building ingredient to greatly increase the viscosity thereof, and a delayed reaction catalyst which promotes the reaction and allows it to proceed, but only after a certain period of time so that the flooding medium has had adequate time to have escaped the area of the injection well.

Applicant has found particularly useful as the basic viscosity-building ingredient of this embodiment of the invention, sodium carboxymethylcellulose (CMC). CMC is a synthetic cellulose gum containing 0.4 to 1.5 sodium carboxymethyl groups per glucose unit of the cellulose, and having a molecular weight of about 21,000 to about 500,000. CMC is a colorless, odorless, tasteless nontoxic material which is readily dispersible in either hot or cold water, and is stable over a relatively large pH range of about 2–10. The viscosities of solutions of CMC vary widely depending upon the number of hydroxyl radicals of the cellulose that have been etherified.

CMC is particularly useful in this context primarily because of its great capacity for viscosity increase, but also because it is relatively inexpensive and available, is effective in minute quantities, has no adverse side effects on the well, is relatively inert when produced with the oil, and reacts in a favorable manner with the other constituents as described below.

Particularly preferred by applicant as the reactive agent in accordance with this embodiment of the invention, is chromium potassium sulfate (chrome alum), $CrK(SO_4)_2 \cdot 12H_2O$. In aqueous solutions of CMC, chrome alum acts to cross-link the CMC thereby increasing the size of the CMC molecules and greatly increasing the viscosity of the CMC.

Other +3 ions, for example iron or aluminum salts, are also useful as the reactive agent.

As the trigger agent or delayed reaction catalyst suitable for attaining viscosity reversal, it is necessary for practicality to select a compatible material which will delay the reaction for a time period of at least several hours and preferably several days. Such trigger agent should have a high oil-water partition coefficient, being much more soluble in oil than in water.

In some contexts of use in relatively strongly acidic solutions, weak acids such as nitrophenol are useful for this purpose. In such circumstances, however, the particular weak acid preferred by applicant is ortho-cresol (or 2-methylphenol), $CH_3C_6H_4OH$. Ortho-cresol is a weak acid which acts as a base in the highly acid system created by chrome-alum. In the presence of CMC and chrome alum, it has been found that ortho-cresol will accelerate the reaction of the chrom alum with the CMC to increase the viscosity thereof, (indeed, that reaction will not generally occur in the absence of this catalytic action) but even so, the completion of the reaction requires a significant time period. In the concentrations employed in the preferred embodiments of this invention, the reaction is delayed for a period of about six days.

Another desirable advantage of the ortho-cresol is that it will attack the native micro-organisms in the formation, such micro-organisms being effective in the absence of any enemy to attack the CMC and effectively reduce the viscosity thereof.

Delay in the reaction and consequent viscosity buildup of the CMC allows the flooding medium to escape the general area of the injection well before such viscosity buildup, thereby preventing inhibition of additional flooding medium which is injected and allowing for the flooding medium to be injected at much lower pump pressures and therefore with greater efficiency.

Selection of the delayed reaction catalyst is 0.1a large extent on the pH of the solution. Thus, a weak acid (such as ortho-cresol) which will behave in a strongly acidic solution as a weak base in the Bronsted sense, is satisfactory for use in such a strongly acidic solution such as the one described above. If the solution is less acidic, however, then a stronger base (a real base) is required.

The acidity of the solution, in turn, will in the example given above depend on the amount of chromium in the solution, the solution becoming less acidic as the chromium content is reduced.

Consequently, in a solution containing less chromium than indicated in the examples given above, a weak acid such as ortho-cresol is not satisfactory. In this connection, applicant has found that weak bases such as tert-butylamine [$(CH_3)_3CNH_2$] and dicyclohexylamine [$(C_6H_{11})_2NH$] are particularly well suited.

Applicant has also found that in these dilute weakly acidic solutions, bases in the Lewis sense (electron donors), such as aldehydes, may also be satisfactory. Specifically, applicant has found that benzaldehyde is an acceptable delayed reaction catalyst in some contexts of use wherein the solution is weakly acidic.

The percentages of the various constituents used in accordance with this embodiment of the invention have been found to be of critical importance. For example, in the embodiment utilizing ortho-cresol as the trigger agent, it has been found that each the CMC and ortho-cresol concentration should generally not exceed 0.1 percent, and that the concentration of the chrome alum should generally not exceed 0.05 percent.

For most economical and efficient operation, and for best results in accordance with this embodiment of the invention, it has been found that the CMC concentration should generally be on the order of about 0.02 to about 0.07 percent, chrome alum should be present in a concentration of about 0.02–0.03 percent, and the percentage of ortho-cresol should be about 0.025–0.10 percent.

More specifically, the exact composition which applicant believes represents the best composition mode of this embodiment of the invention at the time of this application, is 0.06 percent CMC, 0.024 percent chrome alum, and 0.055 percent ortho-cresol, in aqueous solution of soft water having a calcium content of less than about 50 parts per million. It has been found that a higher calcium content in the mixing water will generally inhibit the viscosity buildup reaction.

In those embodiments using other trigger agents, such as the amines or aldehyde mentioned above, percentages equivalent to that given for ortho-cresol will be employed.

A flooding medium provided in accordance with the above formula will result in very great buildup in the water-rich portions of the formation, from less than 3 centipoises at ambient temperature, to about 30 centipoises, within a period of about six days.

As mentioned above, the CMC concentration should be on the order of about 0.02–0.07 percent. Since chrome alum is subject to oxidation which will inhibit its ability to cross-link with the CMC, a reducing agent such as thiosulfate (e.g., sodium thiosulfate) is generally added to the composition upon mixing in order to prevent such oxidation. At CMC concentrations over the entire range specified above, applicant has found that an effect is achieved which will be referred to as a "drag" effect—i.e., the permeability of the water-rich portions will be gradually reduced over a long period of time. This effect is not really equivalent to the "double viscosity" effect which is realized only at the higher CMC concentrations specified within the above range (around 0.05–0.07 percent). This drag effect rapidly diminishes as the thiosulfate concentration increases, and may be completely lost at normal thiosulfate levels.

The ability of the fluid to form the double viscosity is not, however, believed to be effected by the presence of thiosulfate.

Thus, depending on the concentration of thiosulfate, and the concentration of CMC, either a double viscosity effect, or a drag effect, or both of them, may be realized in accordance with this embodiment of the invention.

Most of the discussion herein is directed toward the double viscosity effect, since that is what will be desired in most instances. However, there may be situations when the less expensive fluid having the smaller CMC concentration will be of great benefit to the operator and may, because of economic or other factors, actually be desired.

One advantage of this particular embodiment of the invention is that it is not dependent on bacteria, and that is a desirable factor in many contexts. Also, since the resistance adjacent the injection well bore is great, it is a distinct advantage that this flooding medium does not increase in viscosity until it is away from that bore.

Another advantage of this embodiment is that the flooding medium is easier to handle, and the CMC, being a manufactured product is more uniform and better subject to rigid quality control standards.

It is believed that the viscosity of the flooding medium in the water-rich strata will increase, perhaps rather dramatically, after the first three or four weeks. While this is of no great value since the relative permeabilities at this point will already be significantly different between oil-rich and water-rich strata, neither is it of any real harm.

As mentioned above in connection with another embodiment, sand provides a negatively charged surface acting as a Lewis base; this will accelerate the gellation rate of the flooding medium of this embodiment. [Any base will accelerate the gellation rate.]

Two ways have been found in connection with this embodiment to overcome this potential problem. The first is to assure that pumping is continuous to keep the fluid in motion, since it is extremely thixotropic. The other is to initially inject into the formation, prior to injection of the aqueous flooding medium, a dilute aqueous cationic solution to neutralize the negatively charged sand particles. If this procedure is utilized, the initial injection is desirably followed by injection of a buffer zone of plain fresh water prior to injection of the aqueous flooding medium.

Particularly preferred as such cationic agent for use in this type of pretreatment is chromium potassium sulfate, especially since the chrome alum is present anyway for utilization in the flooding medium. A chrome alum solution of less than 0.1 percent is satisfactory for this purpose.

Other examples of cationic agents useful for this purpose are other chrome or aluminum salts, yielding an available +3 ion.

The viscosity of the flooding medium of this embodiment which has reached water-rich portions of the formation and which has increased to the high values mentioned above, will gradually begin to deteriorate after a prolonged period of time. It is believed that the medium will be effective to inhibit flow through water-rich portions of the formation, however, for a period of approximately two years. Since most water flood operations are completely within that time period, this should pose no real problem to the operator.

In accordance with the method embodiments of the invention, a flooding medium is provided within the framework mentioned above.

Into a first borehole in the formation which represents an injection well, the flooding medium is passed and it is then injected into the formation at a pressure which exceeds the natural formation pressure in the area of the borehole.

Upon injection into the formation, the low viscosity fluid enters both oil-rich and water-rich portions of the formation and begins the water flood process moving toward the producing well.

Since the viscosity of the injected flooding medium is significantly greater in water than in oil, the fluid medium will preferentially seek the oil to drive the oil to a recovery area such as one or more producing wells.

In most cases, the areas into which the flooding medium will pass are areas which have not heretofore been effectively swept by other flooding techniques. Consequently, the recovery of oil is likely to be much greater even if the efficiency of the recovery process is, for one reason or another, not as great as in some prior art processes wherein the fluid sweeps an area which has been swept, often several times, by other flooding fluids.

Well fluids are then produced from the producing well, and upon production it is found that more favorable oil-to-water ratios of well fluids produced are realized than if regular water-flood methods had been used.

It will be recognized that, although the flooding medium of this invention is inexpensive, it is still much more expensive to inject into the well than is water available at the well site. Therefore, it will be understood that following injection of the flooding medium in accordance with the invention for a relatively long time period long enough to reach the water-rich portions of the formation and greatly increase in viscosity therein, water may be used as the flooding medium without the various components as specified above. This will allow less expensive flooding process arter the flooding medium of this invention has accomplished the purposes of the invention.

Although the invention has been described in terms of particularly useful and preferred embodiments which represent the best modes known to applicant at the time of this application, it will be apparent that changes can be made in the compositions and methods described in this specification without departing from the scope of the invention as described in the following claims.

I claim:

1. A method of recovering petroleum oil from a subterranean oil formation which includes injecting into said formation an aqueous flooding medium which assumes a viscosity in oil-rich portions of the formation that is significantly less than the viscosity assumed by said flooding medium in portions of the formation low in oil content, so that said flooding medium acts to bypass the low oil content portions of the formation while selectively seeking the oil-rich portions of the formation, and thereby driving oil from said oil-rich portions toward a recovery area, wherein the aqueous medium contains a high-viscosity imparting material which is highly subject to bacterial degradation by the bacteria present in the formation, and a poisoning agent for said bacteria, said poisoning agent being preferentially soluble in oil as compared to water.

2. The method in accordance with claim 1, wherein the aqueous medium includes a viscosity building ingredient, a reactive agent suitable for reacting with said viscosity building ingredient to form a gel, and a delayed reaction catalyst.

3. The method in accordance with claim 2, wherein said viscosity building ingredient is sodium carboxymethylcellulose.

4. A method of recovering petroleum oil from a subterranean oil formation which includes injecting into said formation an aqueous flooding medium which includes a trigger chemical that is preferentially soluble in oil as compared to water, the dissolving of said trigger chemical in oil being effective to significantly reduce the viscosity of the flooding medium in oil-rich portions of the formation, whereupon the medium will preferentially displace the oil from the formation, wherein said trigger chemical is a bactericide which, upon dissolution, leaves a viscosity-building portion of said medium vulnerable to degradation by formation bacteria.

5. In a method of recovering oil from a subterranean oil formation, the step of introducing into said reservoir an aqueous flooding medium having a material therein which is preferentially soluble in oil, said medium being less viscous when said material transfers to oil, wherein said aqueous medium contains by weight based on water about 0.1 to 0.2 percent guar gum, borate ion, in an amount sufficient to complex with about 15 to about 40 percent of the guar gum and an organic base preferentially soluble in oil over water.

6. In a method of recovering oil from a subterranean oil formation, the step of introducing into said reservoir an aqueous flooding medium having a material therein which is preferentially soluble in oil, said medium being less viscous when said material transfer to oil, wherein said aqueous medium contains by weight based on water less than about 0.05 percent guar gum, borate ion, and an organic acid preferentially soluble in oil over water.

7. In a method of recovering oil from a subterranean oil formation, the step of introducing into said reservoir an aqueous flooding medium having a material therein which is preferentially soluble in oil, said medium being less viscous when said material transfers to oil, wherein said flooding medium contains a material which imparts a high viscosity to the medium but which is subject to rapid bacterial degradation by the bacteria in the formation, and the material which is preferentially soluble in oil is a poisoning agent for said bacteria.

8. The method defined in claim 7, wherein said substance includes polysaccharide.

9. The method defined in claim 7, wherein said aqueous medium contains guar gum.

10. The method defined in claim 7, wherein said poisoning agent is ortho-cresol.

11. A method for recovering petroleum oil from a subterranean formation having portions thereof which are oil-rich and other portions thereof which are water-rich, said method comprising:
    injecting into said formation a flooding medium comprising an aqueous solution of sodium carboxymethylcellulose, a reactive agent suitable for greatly increasing the viscosity of said carboxymethylcellulose, and a delayed reaction catalyst,
    said flooding medium assuming a high viscosity after a substantial period of time in said water-rich portions of the formation, but being ineffective to increase in viscosity in said oil-rich portions of said formation, thereby inhibiting fluid flow through said water-rich portions to preferentially force said flooding meding through oil-rich portions whereupon oil will be driven toward a producing well.

12. A method in accordance with claim 11, wherein said reactive agent is chromium potassium sulfate.

13. A method in accordance with claim 11, wherein said delayed reaction catalyst is ortho-cresol.

14. A method in accordance with claim 11, wherein said delayed reaction catalyst is an electron donor.

15. A method in accordance with claim 14, wherein said electron donor is selected from the group consisting of tert-butylamine, dicyclohexylamine, and benzaldehyde.

16. A method in accordance with claim 11, wherein said sodium carboxymethylcellulose is present in a concentration of from about 0.05 to about 0.07 percent by weight.

17. A method in accordance with claim 16, wherein said reactive agent is chromium potassium sulfate.

18. A method in accordance with claim 17, wherein said chromium potassium sulfate is present in a concentration of from about 0.02 to about 0.03 percent by weight.

19. A method in accordance with claim 18, wherein said delayed reaction catalyst is selected from the group consisting of orthocresol, tert-butylamine, dicyclohexylamine, and benzaldehyde.

20. A method for recovering petroleum oil from a subterranean formation having portions thereof which are oil-rich and other portions thereof which are water-rich, said method comprising:
providing an aqueous flooding medium comprising a viscosity building ingredient, a reactive agent which will react with said viscosity building ingredient to greatly increase the viscosity thereof in an aqueous atmosphere, and a delayed reaction catalyst which promotes said reaction but prevents reaction for a significant period of time after initial mixing,
injecting said aqueous flooding medium into an injection well in said formation, whereupon said medium enters both oil-rich and water-rich portions of said formation,
said flooding medium assuming a high viscosity after a substantial period of time in said water-rich portions of the formation, but being ineffective to increase in viscosity in said oil-rich portions of said formation, thereby inhibiting fluid flow through said water-rich portions to perferentially force said flooding medium through oil-rich portions whereupon oil will be driven toward a producing well, and thereafter
producing well fluids from said producing well.

21. A method in accordance with claim 20, wherein said viscosity building agent is sodium carboxymethylcellulose.

22. A method in accordance with claim 21, wherein said reactive agent is chromium potassium sulfate.

23. A method in accordance with claim 21, wherein said delayed reaction catalyst is selected from the group consisting of ortho-cresol, tert-butylamine, dicyclohexylamine, and benzaldehyde.

24. A method in accordance with claim 21, wherein said sodium carboxymethylcellulose is present in a concentration of from about 0.05 to about 0.07 percent by weight.

25. A method in accordance with claim 24, wherein said reactive agent is chromium potassium sulfate.

26. A method in accordance with claim 25, wherein said chromium potassium sulfate is present in a concentration of from about 0.02 to about 0.03% by weight.

27. A method in accordance with claim 25, wherein said aqueous medium comprises by weight about 0.06% sodium carboxymethylcellulose, about 0.024% chromium potassium sulfate, and about 0.055% delayed reaction catalyst selected from the group consisting of ortho-cresol, tert-butylamine, dicyclohexylamine, and benzaldehyde.

28. A method for recovering petroleum oil from a subterranean formation having some portions which are water-rich and other portions which are oil-rich, said formation also including at least first and second boreholes therein, said method comprising:
providing an aqueous flooding medium which comprises sodium carboxymethylcellulose, chromium potassium sulfate, and ortho-cresol,
passing said flooding medium into said first borehole and thence injecting said medium into said formation at a pressure in excess of the natural formation pressure in the well at said first bore-hole,
said flooding medium being passed into both oil-rich and water-rich portions of said formation, whereupon said flooding medium assumes after a substantial period of time a high viscosity in said water-rich portions but maintains a viscosity in said oil-rich portions that is not significantly greater than the original viscosity of the medium,
said flooding medium being thereby effective to substantially inhibit fluid flow through the water-rich portions and to thereby increase the oil-to-water ratio upon production, and
thereafter producing well fluids from said second borehole.

29. A method in accordance with claim 28, wherein said aqueous medium contains by weight about 0.05–0.07 percent sodium carboxymethylcellulose, about 0.02–0.03 percent chromium potassium sulfate, and about 0.05–0.10 percent delayed reaction catalyst selected from the group consisting of ortho-cresol, tert-butylamine, dicyclohexylamine, and benzaldehyde.

30. A method in accordance with claim 28, wherein a cationic solution is injected into said formation through said injection well, prior to injection of said flooding medium.

31. A composition for use as a flooding medium in post-primary recovery processes of petroleum oil from a subterranean formation, comprising a viscosity building ingredient, and an agent which promotes high viscosity buildup of said ingredient in water-rich portions of the formation but does not promote significant viscosity buildup of said ingredient in oil-rich portions of said formation, thereby inhibiting fluid flow through water-rich portions of the formation and preferentially flooding the oil-rich portions to increase the oil-to-water production ratio, wherein said viscosity building ingredient is guar gum, and said agent comprises a poisoning agent for bacteria that attack said guar gum, said poisoning agent being preferentially soluble in oil.

32. A composition for use as a flooding medium in post-primary recovery processes of petroleum oil from a subterranean formation, comprising a viscosity building ingredient, and an agent which promotes high viscosity buildup of said ingredient in water-rich portions of the formation but does not promote significant viscosity buildup of said ingredient in oil-rich portions of said formation, thereby inhibiting fluid flow through water-rich portions of the formation and preferentially flooding the oil-rich portions to increase the oil-to-water production ratio, wherein said viscosity building ingredient is sodium carboxymethyl-cellulose and said agent is a reactive agent suitable for gelling said sodium carboxymethylcellulose in the presence of water.

33. A composition for use as a flooding medium in post-primary recovery processes for the recovery of petroleum oil from a subterranean formation, comprising sodium carboxymethylcellulose, a reactive agent suitable for reacting with said sodium carboxymethylcellulose to greatly increase the viscosity thereof, and a delayed reaction catalyst suitable for delaying the reaction between reactive agent and sodium carboxymethylcellulose, but also being effective to promote that reaction after a substantial period of time.

34. A composition in accordance with claim 33, wherein said reactive agent is chromium potassium sulfate and said delayed reaction catalyst is ortho-cresol.

35. A composition for use as a flooding medium in post-primary recovery processes for the recovery of petroleum oil from a subterranean formation, comprising sodium carboxymethylcellulose, a reactive agent suitable for reacting with said sodium carboxymethylcellulose to greatly increase the viscosity thereof, and a delayed reaction catalyst suitable for delaying the reaction between reactive agent and sodium carboxymethylcellulose, but also being effective to promote that reaction after a substantial period of time, wherein said reactive agent is chromium potassium sulfate and said delayed reaction catalyst is selected from the group consisting of ortho-cresol, tert-butylamine, dicyclohexylamine, and benzaldehyde.

36. A composition in accordance with claim 35, wherein said aqueous medium includes by weight from about 0.02 to about 0.07 percent sodium carboxymethylcellulose, from about 0.02 to about 0.03 percent chromium potassium sulfate, and from about 0.05 to about 0.10 percent delayed reaction catalyst.

37. A composition in accordance with claim 36, wherein the concentration of said sodium carboxymethylcellulose is about 0.06 percent, the concentration of said chromium potassium sulfate is about 0.024 percent, and the concentration of said delayed reaction catalyst is about 0.055 percent.

38. A method in accordance with claim 35, wherein said delayed reaction catalyst is selected from the group consisting of ortho-cresol, tert-butylamine, dicyclohexylamine, and benzaldehyde.

39. A method of recovering petroleum oil from a subterranean oil formation which includes injecting into said formation an aqueous flooding medium which includes by weight from about 0.02 to about 0.07 percent sodium carboxymethylcellulose, a reactive agent suitable for cross-linking the sodium carboxymethylcellulose to increase the viscosity thereof in water, and a delayed reaction catalyst.

40. A method in accordance with claim 39, wherein said reactive agent is chromium potassium sulfate.

* * * * *

UNITED STATES PATENT OFFICE
CERTIFICATE OF CORRECTION

Patent No. 3,800,872     Dated April 2, 1974

Inventor(s) Robert H. Friedman

It is certified that error appears in the above-identified patent and that said Letters Patent are hereby corrected as shown below:

Column 3, line 50, "poisong" should read --poisoning--.

Column 12, line 38, "0.1" should read --dependent to--.

Column 15, line 21, "arter" should read --after--.

Column 16, line 17, "transfer" should read --transfers--; line 54, "meding" should read --medium--.

Signed and sealed this 10th day of September 1974.

(SEAL)
Attest:

McCOY M. GIBSON, JR.
Attesting Officer

C. MARSHALL DANN
Commissioner of Patents